(12) United States Patent
Vincze et al.

(10) Patent No.: US 10,177,369 B2
(45) Date of Patent: Jan. 8, 2019

(54) METHOD AND APPARATUS FOR CONTINUOUSLY MIXING BATTERY PASTES

(75) Inventors: Albert M. Vincze, Oakville (CA);
Douglas G. Clark, Charlottetown (CA);
Victor Nasri Saleh, Brampton (CA);
Malcolm John Dewar, Grimsby (CA);
Robert W. Fritts, Thomasville, NC (US)

(73) Assignee: MITEK HOLDINGS, INC., Wilmington, DE (US)

( * ) Notice: Subject to any disclaimer, the term of this patent is extended or adjusted under 35 U.S.C. 154(b) by 1425 days.

(21) Appl. No.: 11/812,598

(22) Filed: Jun. 20, 2007

(65) Prior Publication Data
US 2008/0003501 A1    Jan. 3, 2008

Related U.S. Application Data

(60) Provisional application No. 60/907,859, filed on Apr. 19, 2007, provisional application No. 60/814,906, filed on Jun. 20, 2006.

(51) Int. Cl.
*H01M 4/88* (2006.01)
*H01M 10/16* (2006.01)
(Continued)

(52) U.S. Cl.
CPC ............... *H01M 4/20* (2013.01); *H01M 4/72* (2013.01); *H01M 10/06* (2013.01); *Y02E 60/126* (2013.01); *Y02P 70/54* (2015.11)

(58) Field of Classification Search
CPC ...................................................... H01M 4/20
See application file for complete search history.

(56) References Cited

U.S. PATENT DOCUMENTS 3,576,675 A    4/1971  Abramson et al.
3,618,902 A *  11/1971  Brennan, Jr. ................. 366/301
(Continued)

FOREIGN PATENT DOCUMENTS

JP    58-128653    1/1983
JP    01-258346    10/1989
(Continued)

OTHER PUBLICATIONS

Klein, Ian, et al. "Improved Batteries with Micronised 4-Basic Lead Sulphate Additive for Positive Plates." PENOX GmbH, Jul. 25, 2005.*

(Continued)

*Primary Examiner* — Stephan J Essex
(74) *Attorney, Agent, or Firm* — Stinson Leonard Street LLP (57) ABSTRACT

A process and apparatus for continuously mixing and applying paste to battery grids for use in lead-acid battery systems, in which particulate lead oxide, water and sulphuric acid are reacted in an elongated mixer having a mixing to conveying ratio of about 65:35 to 80:20 with controlled reaction temperature for an exit product temperature in the range of above 60° C. to about 80° C. Additives including reinforcing fibers can be added in an amount up to 0.6 wt % of the lead oxide and carbon and graphite powder can be added in an amount up to 6 wt % of the lead oxide.

30 Claims, 9 Drawing Sheets

Process Flow (51) Int. Cl.
*H01M 4/20* (2006.01)
*H01M 4/72* (2006.01)
*H01M 10/06* (2006.01)

(56) References Cited

U.S. PATENT DOCUMENTS

| | | | |
|---|---|---|---|
| 4,346,022 A | 8/1982 | Wolcott et al. | |
| 5,096,611 A * | 3/1992 | Matthew et al. | 252/182.1 |
| 6,454,977 B1 * | 9/2002 | Kwok et al. | 264/104 |
| 6,733,547 B2 | 5/2004 | Ma | |
| 6,755,874 B2 | 6/2004 | Chen et al. | |
| 6,886,439 B2 | 5/2005 | Marlow et al. | |
| 7,007,579 B2 | 3/2006 | Marlow et al. | |
| 7,011,805 B2 | 3/2006 | Flores-Lira et al. | |
| 2002/0124388 A1 * | 9/2002 | Chen et al. | 29/623.5 |
| 2003/0035998 A1 * | 2/2003 | Zguris et al. | 429/225 |
| 2006/0088465 A1 | 4/2006 | Flores-Lira et al. | |
| 2006/0093912 A1 * | 5/2006 | Mayer | 429/227 |
| 2006/0096079 A1 | 5/2006 | Farina | |
| 2006/0110524 A1 | 5/2006 | Zhang et al. | |
| 2006/0216599 A1 * | 9/2006 | Boden | 429/227 |

FOREIGN PATENT DOCUMENTS

| | | |
|---|---|---|
| JP | 05-205740 | 8/1993 |
| JP | 05-205732 A2 | 12/1993 |
| JP | 08-236106 A2 | 12/1996 |
| JP | 04-505827 | 7/2010 |
| WO | 2005/094501 | 10/2005 |

OTHER PUBLICATIONS

India First Examination Report for Application No. 9890/DELNP/2008, dated Oct. 7, 2015, 2 pages.

Brazilian Examination Report for Application No. PI0713611-0, dated Aug. 7, 2017, 8 pages with English translation.

* cited by examiner

Fig. 1

The active material for an unformed positive commercial plate (1000X)

Fig. 3

The unformed positive action material in the plate with Paste #1 (1000X)

Fig. 4

The unformed positive active material in the plate with Paste #2 (1000X)

Fig. 5

The unformed active material in the plate with Paste #3 (1000X)

Polypropylene Fibre 0.3 wt.%

Acrylic Fibre 0.3 wt.%

METHOD AND APPARATUS FOR CONTINUOUSLY MIXING BATTERY PASTES

BACKGROUND OF THE INVENTION (i) Field of the Invention

This invention relates to the application of an electrochemically active paste to battery grids and, more particularly, relates to a method and apparatus for continuously mixing and producing an electrochemically active paste for continuous application to a battery grid in a discrete or continuous form for use in lead-acid battery systems.

(ii) Description of the Related Art

U.S. Pat. Nos. 6,886,439 and 7,007,579 granted May 3, 2005 and Mar. 7, 2006 respectively to Teck Cominco Metals Ltd. disclose a method and apparatus for continuously producing positive and negative electrode plates from continuous metal mesh freshly pasted with an electrochemically active paste without the use of paper barriers to produce battery plates for use in lead-acid batteries, both patents incorporated herein by reference. The battery paste typically is produced by a batch process in which ingredients comprised of dry particulate lead oxide, water and sulphuric acid, along with other ingredients, are mixed together to produce a paste of desired viscosity to saturate cavities in the mesh strip and to coat and adhere to the opposite sides of the mesh strip.

Batch production of battery paste, which typically requires 20 or more minutes of mixing, inherently results in lack of uniformity of viscosity and ingredient composition. Due to conventional batch mixing techniques, exothermic heating resulting from chemical reactions within the paste is difficult to control, producing localized high paste temperatures. Batch processes typically are operated at about 60° C., with application of paste at about 49° C.

It is common for lead oxide conveyed by various means in the manufacture of lead acid batteries to become clumped and crusty prior to entering into the paste mixing system. These random clumps can be friable or hard impinged material from caking on the pipes or apparatus or from wet and reacted material in a near clinker state because of lead oxide contact with water due to leaks in the system or due to presence of condensation. The clumped material can not easily be screened or separated from the product stream, since any removal device is quickly plugged by the inherent stickiness of the powder, causing increased maintenance problems and increased down time. Conventional batch mixing processes rarely breaks these clumps and, even when broken, the pieces are not sufficiently small to pass through the subsequent pasting operations without causing blockage and shutdown. These particles not only disrupt the normal operation, but can greatly increase the amount of scrap produced.

Attempts have been made for over 35 years to continuously produce battery paste, preferably on a demand basis, to acquire the implicit benefits of a continuous process without success. Batch mixing problems have resulted in the lack of uniform water content in the paste, necessary for desired density, viscosity and shear of the paste to permit application of the paste to battery plates in a consistent and reproducible manner. Inadequate mixing action has resulted in delayed and incomplete chemical reaction within mixers, with completion of reaction in the product paste outside the mixers, unless feed rates are extremely low.

U.S. Pat. No. 3,576,675 granted Apr. 27, 1971 to Ford Motor Company discloses a method and apparatus for continuous mixing and production of battery paste in which the feed rate of dry particulate lead oxide fed to a mixer housing is monitored and quantities of water and sulphuric acid are sequentially injected into the mixer housing as functions of the weight of lead oxide. The mixing apparatus includes a pair of parallel rotating shafts having mixing paddles mounted thereon separated by alternating stationary flow control discs to direct paste constituents radially across the mixer housing in a slow rolling action as they move through the housing. Notwithstanding the long-felt need for continuous mixing and production of battery paste for consistency of composition and viscosity, the technology of U.S. Pat. No. 3,576,675 has not been commercially used.

Fibres such as polymer or modacrylic fibres are typically added to the battery paste in an amount of about 0.03% to 0.15% of the lead oxide to improve the mechanical strength of the plate and to reduce cracking of the active mass. Some fibres are difficult to disperse, resulting in poor plate strength as well as problems in the pasting machine due to fibre clumping. Further, negative effects include pulling out and distortion of pellets from the plates during subsequent handling. These problems are exaggerated as greater amounts of fibre are added. Long fibres, desirable for better strength, are even more difficult to mix in batch systems and, therefore, are avoided by battery manufacturers. Polypropylene fibres are particularly difficult to mix into paste in batch systems and are therefore seldom used.

Particulate carbon in the form of organic carbon powder, activated carbon powder, or graphite powder, flakes or spheres can be added with other constituents, such as carbon-based expanders, to improve conductivity of negative battery plates in all lead-acid battery types (SLI, industrial, etc.). Presently, carbon is added at a level of 0.3% to 1% by weight of the lead oxide. In some cases, a higher level of carbon would be desirable, but this is not practically possible in the conventional batch system because the carbon cannot be incorporated and dispersed properly for a homogeneous mix, due to the wide difference in density between lead oxide and carbon and due to clumping and caking of the carbon, resulting in unacceptable pastes.

There are many different types of lead-acid batteries and many more different applications. Due to the diversity of the product, some battery manufacturers use many different types of additives. One such additive is tetrabasic lead sulphate seed crystals, again available in several different forms. These additives shorten the curing process and assure proper curing and conversion of the active material to a desired tetrabasic lead sulphate crystal make-up with proper crystal size, shape and distribution. This controlled crystal morphology adds strength to the active mass of the battery plate and increases the life of the product. The additives help to seed the growth of the tetrabasic lead sulphate crystals, providing seed points for the growth of these crystals. In normal batch mixers, the distribution is less than desired, leaving large areas deprived of seed, while other areas are enriched with seed resulting in growth reactions being too great and reaction chemicals being depleted before the reaction can complete the formation of the crystals as desired. This causes variations in the percentage of overall tetrabasic lead sulphate crystals and affects the size and structure of the crystals.

The presence of small amounts of tetrabasic lead sulphate in battery paste often is desired as a seed in the curing stage of the battery-production process. Tetrabasic lead sulphate cannot be readily produced or controlled in batch processes and accordingly is added to the paste in conventional batch processes.

SUMMARY OF THE INVENTION

It is a principal object of the present invention to continuously mix and produce electrochemically active pastes of uniform composition, water distribution and fluidity, with controlled maximum particle size, and thereby the ability to paste grids more uniformly with improved weight tolerances.

It is another object of the present invention to continuously mix and produce an electrochemically active paste within a narrow temperature range for control of rate of exothermic chemical reaction and of physical characteristics of paste constituents, and for the production when desired of tetrabasic lead sulphate paste.

It is a further object of the invention to continuously produce a battery paste containing increased amounts of uniformly dispersed reinforcing fibres for enhanced paste strength and carbon powder or graphite powder, flakes or spheres for improved conductivity.

And a further object of the invention is the provision of a continuous paste mixing process which, by virtue of substantially complete mixing and the ability to regulate mix temperatures over a broad range, enables a reduction or elimination of flash cure times and reduced or entirely eliminate the flash cure process temperatures with a reduction of the duration of the curing process for furnished pasted plate.

In its broad aspect, the method of the present invention for continuously producing paste in a process for the continuous production of pasted battery plates comprises continuously feeding particulate lead oxide to an elongated reactor mixer having a plurality of mixing paddles and conveying paddles in series, continuously injecting water and sulphuric acid sequentially to the lead oxide in the reactor mixer, mixing and reacting the sulphuric acid with the wetted particulate lead oxide to form a mixture for passage through the elongated reactor for a controlled retention time in the mixer under predetermined mixing and conveying conditions whereby the mixture is subjected to a ratio of mixing to conveying in the reactor mixer of about 65:35 to 80:20, preferably about 75:25, and controlling the temperature of the mixture of lead oxide, water and sulphuric acid as it passes through the elongated reactor along the length of the reactor for a maximum temperature of a discharge product in the range of above 60° C. to about 80° C., preferably about 68° to 79° C., whereby the rate of reaction of the sulphuric acid with the lead oxide and the particle size, homogeneity, consistency, density, plasticity and porosity of the reaction product are controlled.

The controlled retention time in the reactor mixer is in the range of about 30 to 45 seconds under mixing conditions at a rate of revolution of about 100 to 150 revolutions per minute (RPM).

The reactor mixer for continuously producing paste for battery plates comprises an elongated housing having a feed inlet at one end for receiving particulate lead oxide feed material and a discharge outlet at the opposite end for continuously discharging lead paste, a pair of opposed shafts rotatably mounted in said housing extending from the feed inlet to the discharge outlet, a forward screw section formed on each shaft for conveying lead oxide feed material forwardly into the reactor mixer, and a mixing section formed on each shaft extending from the forward screw section to the discharge outlet, each said mixing section comprising a plurality of mixing paddles and conveying paddles in series in a ratio of 65:35 to 80:20 of mixing paddles to conveying paddles, said mixing paddles and conveying paddles having a clearance of 1.52 mm, for advancing said paste material radially across and through the housing to the discharge outlet while concurrently reducing the size of particulate lead oxide feed material to less than 1.52 mm in size.

The battery paste continuously produced by the method of the invention has a maximum particle size less than 1.52 mm and a lead sulphate crystal size in the range of 2 to 5 microns in substantially tribasic form. Preferably, the paste also contains at least one of carbon powder, activated carbon powder, graphite powder, graphite flakes or graphite spheres in an amount up to 6 wt % of the lead oxide feed uniformly dispersed within the paste, and polymer fibres, glass fibres or cellulose fibres in an amount up to about 0.6 wt % of the lead oxide feed uniformly dispersed within the paste.

DESCRIPTION OF THE PREFERRED EMBODIMENT

Figure 1:
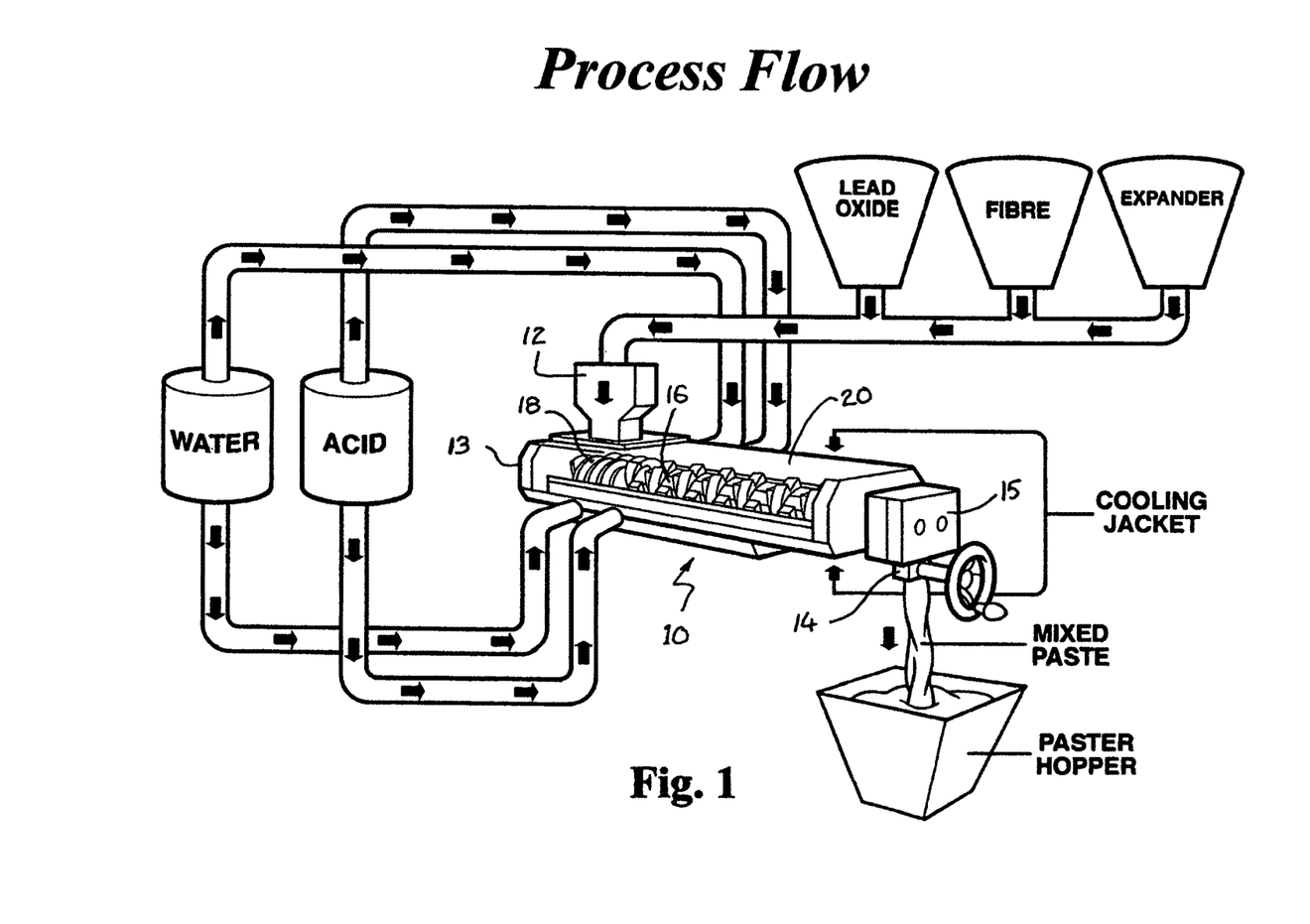
FIG. 1 is a schematic illustration, in perspective, of the flowsheet of the process of the invention.

FIG. 1 illustrates schematically in perspective the flowsheet of the invention showing sequential addition of water and acid to tubular mixer 10 having an upper feed inlet 12 at one end 13 for receiving particulate lead oxide, fibre and carbon with an expander.

Figure 2:
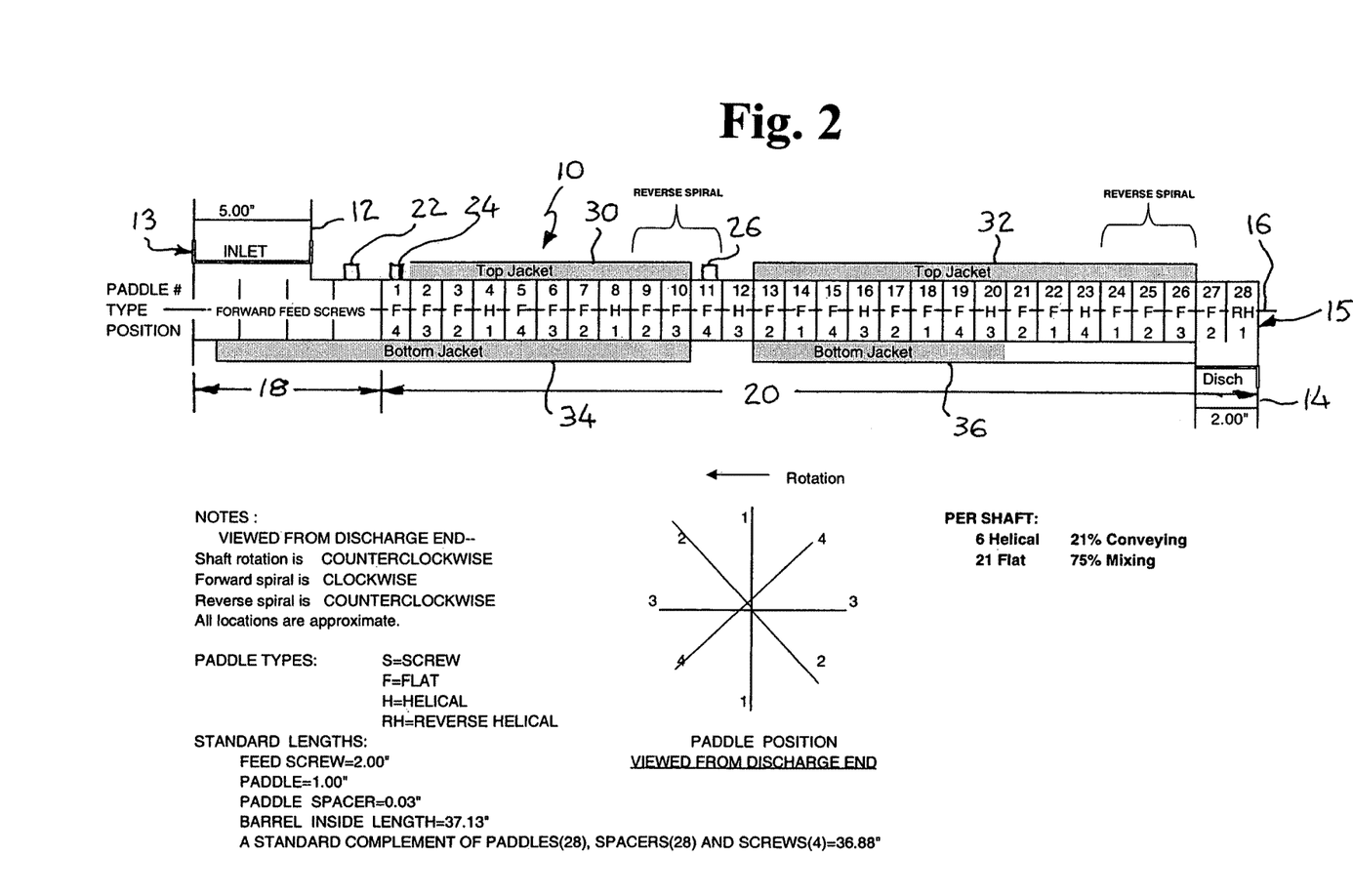
FIG. 2 is a schematic illustration of the apparatus of the present invention.

FIG. 2 illustrates schematically in more detail the elongated tubular reactor mixer 10 of the invention having the upper feed inlet 12 at one end 13 for receiving the particulate lead oxide and the lower outlet 14 at the opposite discharge end 15 for continuous discharge of lead paste. A pair of shafts depicted by numeral 16, one of which is shown, are mounted for rotation longitudinally through tubular reactor mixer 10 from feed inlet 12 to discharge outlet 14. Mounted on each shaft 16 at inlet end 13 is a forward screw section 18 for conveying feed material forwardly into reactor mixer 10 towards the discharge end 15. Mixing section 20, extending from forward screw section 18 to discharge end 15, comprises flat paddles "F" and helical paddles "H", with reverse helical paddles "RH" at the discharge end 15. Flat paddles F are mixing paddles and helical paddles H are conveying paddles providing a ratio of mixing to conveying in mixing section 20 of about 65:35 to 80:20, preferably about 75:25, compared to known prior art typically using a 25:75 or a 50:50 mixing to conveying ratio. Synchronized rotation of shafts 16 by a gear drive, not shown, rotates opposed paddles described above to direct paste material radially across the housing and to provide thorough mixing with a fast kneading action. It has been found that a retention time in the reactor mixer of about 30 to 45 seconds with the mixing and shear provided by the above arrangements of paddles under temperature control yields optimum crystal size and structure.

The intensity of mixing is significant. We have found that agitation and shear provided by rotation of the paddles in the mixing section at a speed of about 100 to 150 RPM, corresponding to the retention time in the reactor mixer of about 45 to 30 seconds, provides a thermally stable lead paste of desired composition. This is in contrast to conventional batch mixing which typically requires 20 or more minutes of mixing time.

Water in the amount of 9 to 15 wt % of the lead oxide can be added with the lead oxide at feed inlet 12 or separately to the reactor mixer at inlet 22 in proximity to feed inlet 12 for rapid mixing with and wetting of the lead oxide. Sulphuric acid having a gravity of 1.325 in the amount of 7 wt % to 16 wt % of the lead oxide for production of tribasic lead sulphate is fed downstream of the water feed preferably in two or more inlets 24, 26 to minimize localized reactivity and to avoid heavy sulphation or monobasic sulphate.

Fibres such as polypropylene, modacrylic, cellulose and glass fibre can be added in amounts up to 0.6 wt % of the lead oxide, about a five times increase of fibre content compared to the amount mixable by batch mixing, with an increase in fibre length up to 3/16 inch. for modacrylic fibre and 1/8 inch. for polypropylene fibre. Continuous mixing with increased amounts of longer fibres by the continuous mixing process provide excellent dispersion of the fibres resulting in production of physically stronger battery plates with extended battery life. Excellent dispersion of the fibres results in less fibres being actually required to achieve desired results, thereby effecting a cost saving.

Carbon powder in the form of organic carbon, carbon powder, activated carbon powder, graphite powder, graphite flakes or graphite spheres can be added in amounts up to 6 wt % of the lead oxide with excellent dispersion of the carbon, a six times increase in carbon content compared to typical carbon contents of up to 1 wt % in batch mixes, without loss, clumping or caking of the carbon. Homogeneous batch mixing of carbon at levels exceeding 1 wt % has been very difficult due to clumping and caking of the carbon and due to the difference in the inherent densities of lead oxide and carbon.

Reactor temperature can be closely controlled at an elevated level to provide a desired amount of tetrabasic lead sulphate ($4PbO-PbSO_4$) to act as a seed in the curing process. The formation and presence of tetrabasic lead sulphate in the process under rapid mixing and high temperature conditions eliminates the need for the addition of expensive additives, while reducing subsequent curing time. If it is desired, tetrabasic lead sulphate can be added as a seed with the lead oxide feed.

Top water jackets 30 and 32 and bottom water jackets 34 and 36 receiving cooling water under pressure are controlled to maintain the mixture at a temperature during passage through reactor mixer 10 for discharge of paste at a temperature in the range of above 60° to 80° C., preferably about 68° to 79° C. Operating temperature of the process typically reaches about 68° to 69° C. within 5 seconds and remains at 68° to 69° C. until discharge and application of paste to battery grid electrodes. Temperatures above 70° C. have been found to cause exothermic reaction with growth and formation of a tetrabasic lead sulphate crystal structure, which acts as a seed to accelerate the battery plate curing process, if desired.

The process of the invention will now be described with reference to the following exemplary tests.

A barrel reactor mixer having an inside diameter of 5" with barrel inside length of 37.13" had a shaft 16 journaled axially therein with a 2.00" diameter feed screw in forward feed screw section 18 and 1.00 inch paddles F, H and RH assembled onto shaft 18 separated axially by 0.03" spacers. The assembled complement of 28 paddles, divided into 6 helical and 21 flat paddles, 28 spacers and 4 screws had a total length of 36.88".

The paddles were rotated at 150 RPM for a retention time in the reactor mixer of 30 seconds and a throughput of about 125 pounds per minute. Slower speeds such as at 75 RPM resulted in localized heating with production of undesirable small particles.

Particulate lead oxide having an average size of about one micron was fed at a uniform rate into feed inlet 12. Although the solid feed is referred to herein as lead oxide, the lead oxide feed may contain up to 25 to 30 wt % metallic lead, the balance essentially lead oxide, with minor amounts of inert fiber to reinforce the paste. Water was added in the amount of about 12 lbs of water per 100 lbs. of lead oxide fed into inlet 12 of reactor mixer 10. Sulphuric acid having a S.G. of 1.325 was added in the amount of 13 lbs. per 100 lbs. of lead oxide feed. The constituents were conveyed by forward feed screws into the reactor mixer 10 for intimate mixing of the lead oxide with the water and the sulphuric acid for a predetermined retention time in the reactor of about 30 seconds under controlled temperature conditions to acquire optimum crystal size and structure with temperature equilibrium. Monitoring of the final discharge paste product showed no temperature change, which indicated chemical reactions were complete.

Paste product discharged at an average temperature of about 68° C. was applied to expanded lead grids produced by the process disclosed in U.S. Pat. No. 6,884,439 and cured at 40° C. for 24 hours at each of the following relative humidities of 100%, 80% and 50% for a total of 72 hours of curing.

The pasted plates were formed for about 30 hours at 1.2 Amps/plate for 200% theoretical capacity of positive paste.

The formed plates were cycled at 100% depth of discharge for 30 cycles with a recharge, following each discharge, of 115% (Amp hour) of the previous discharge. The capacity of the plates was comparable to commercial plates with a capacity range of 48% to 52% during the first few cycles. Capacity at 30 cycles was still 45% to 48% which for a commercial plate would be considered very good performance. At 30 cycles the plates were removed and examined even though capacity was still very good. Paste adhesion to the grid was rated as excellent with a strong bond. The pellet was still firm and resisted breaking, a good indication that the plate was many cycles away from failure.

The following provides morphology comparisons between paste from a conventional batch process and those from the present invention.

Figure 3:
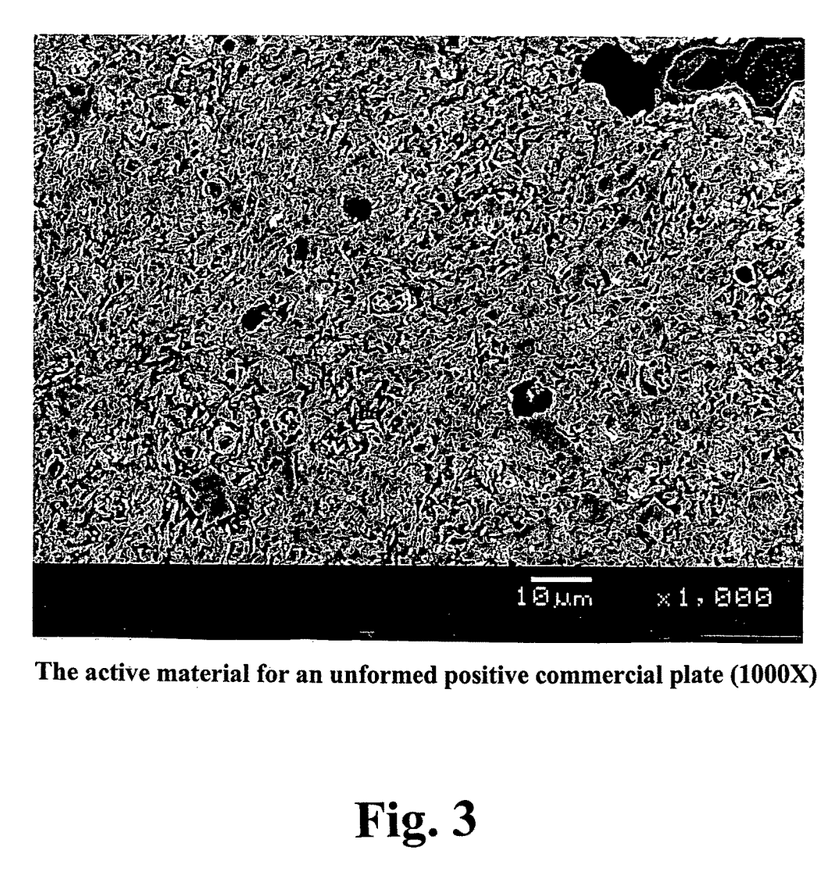
FIG. 3 is a micrograph at 1000× magnification of an unformed and cured positive active commercial batch lead oxide paste.

A micrograph of unformed positive active material taken from a commercial battery plate is given in FIG. 3. The term "formed" in reference to paste is well-known in the battery industry. It refers to the formation process whereby cured plates are exposed to acid for the chemical formation of $PbO_2$. The term "unformed" referred herein means the paste has not been exposed to battery acid. The micrograph revealed that the major compounds of the unformed active material were tribasic lead sulfate ($3PbO.PbSO_4\ H_2O$) and red lead oxide. Some residual metallic lead particles were also observed. Several big tetrabasic lead sulfate crystals are visible and the micrograph showed that the tribasic lead sulfate crystals were well developed with a size about 1×3 au, indicating that this plate had been well cured.

Figure 4:
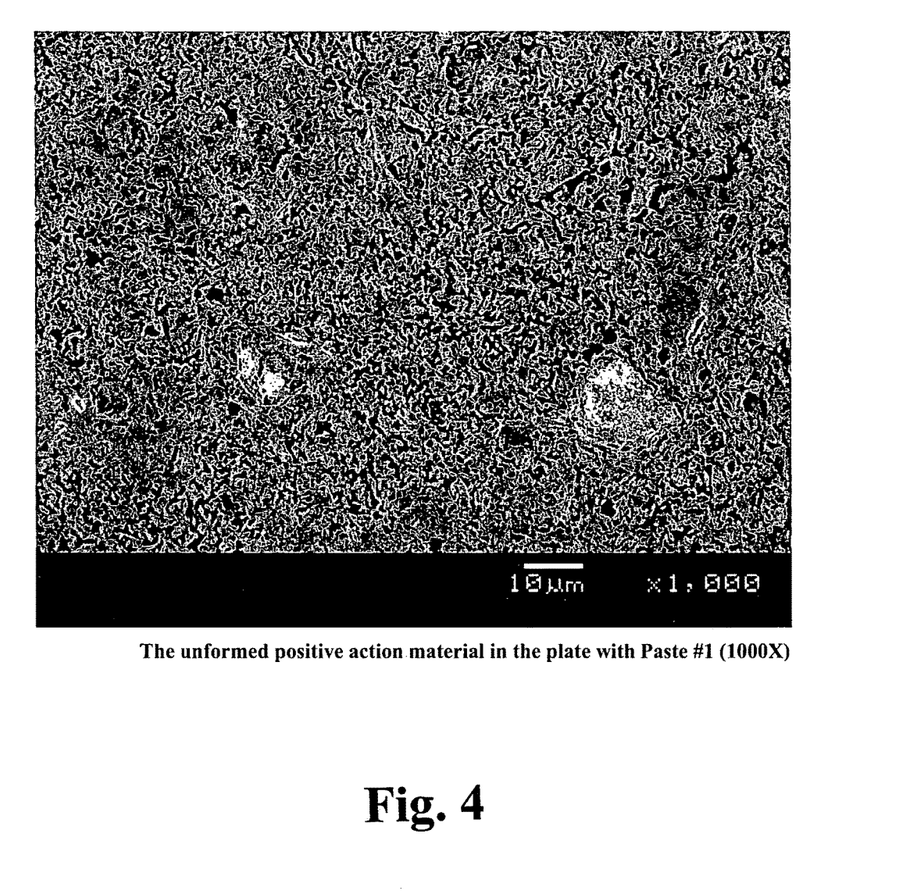
FIG. 4 is a micrograph at 1000× magnification of unformed and cured positive active lead oxide paste produced according to the process of the present invention but with slow mixing at 75 RPM.

With reference to FIG. 4, which is a micrograph of paste produced according to the present invention but at a speed of rotation at only 75 RPM, with a retention time of about 60 seconds (Paste No. 1), numerous bright metallic particles can be seen indicating that oxidation of the paste was not fully carried out. Tribasic crystals were relatively small compared with those in the plates in commercial batteries. A very high percentage of the active material was in the form of submicron particles and amorphous substance.

An X-ray diffraction pattern of the paste confirmed that the active material contained red lead oxide, tribasic sulfate and metallic lead. It also indicated that the unformed active material contained some lead carbonate compounds.

The excessive amount of metallic lead and the small underdeveloped tribasic lead sulfate crystals were likely the result of insufficient mixing at 75 RPM. This paste is not considered commercially useful.

Figure 5:
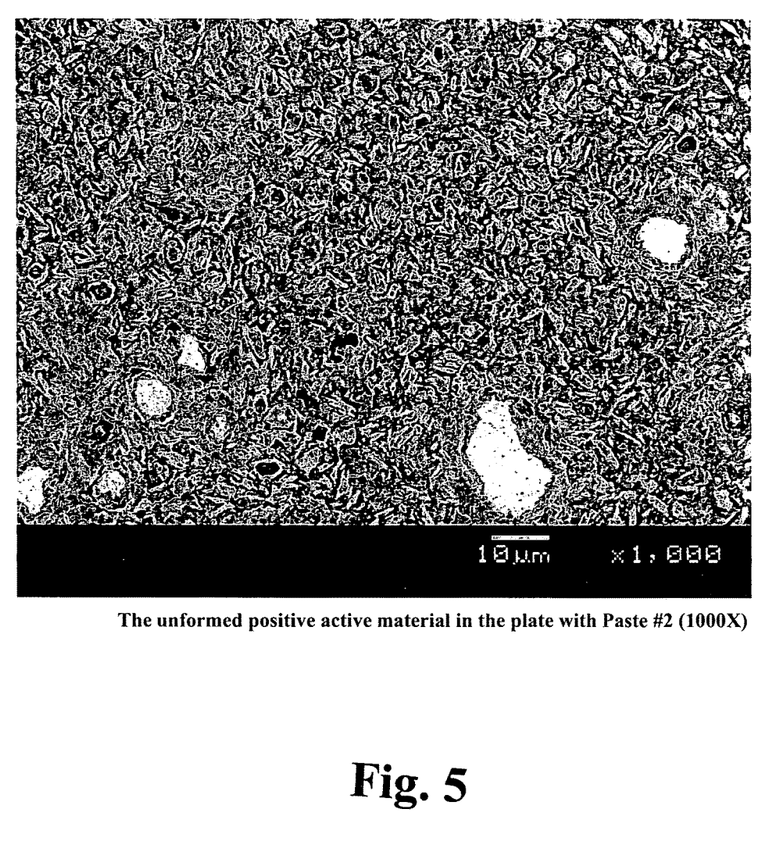
FIG. 5 is a micrograph at 1000× magnification of unformed and cured positive active lead oxide paste produced according to the process of the present invention with moderate mixing at 100 RPM.

Turning to FIG. 5, which is a micrograph of paste produced according to the present invention at a mixing speed of 100 RPM for 45 seconds retention (Paste No. 2), the tribasic lead sulfate crystals appeared to be larger and more numerous compared with those shown in FIG. 4.

Figure 6:
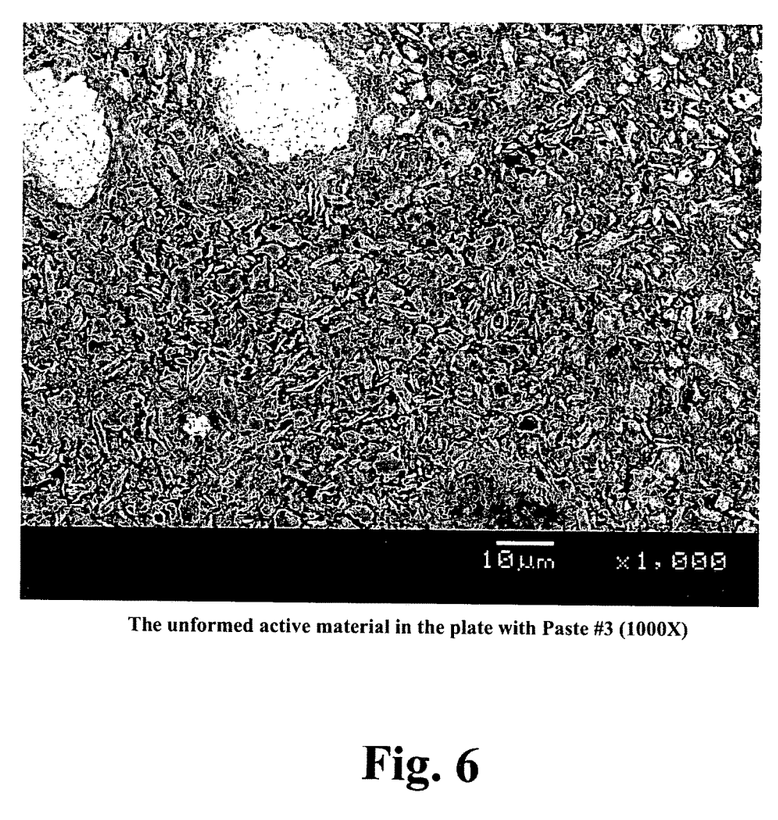
FIG. 6 is a micrograph at 1000× magnification of unformed and cured positive active lead oxide paste produced according to the process of the present invention with rapid mixing at 150 RPM.

The micrograph of FIG. 6, which is a micrograph of paste produced according to the present invention at a mixing speed of 150 RPM for 30 seconds retention (Paste No. 3), indicated that the active material in this plate was almost identical to that in the plate shown in FIG. 5. However, a free lead analysis of this paste indicated a lower and more desirable free lead content by about 0.5% in comparison to the 100 RPM material.

The results showed that the two unformed active materials in FIGS. 5 and 6 were comparable to the unformed active material in FIG. 3 from commercial batteries.

Figure 9:
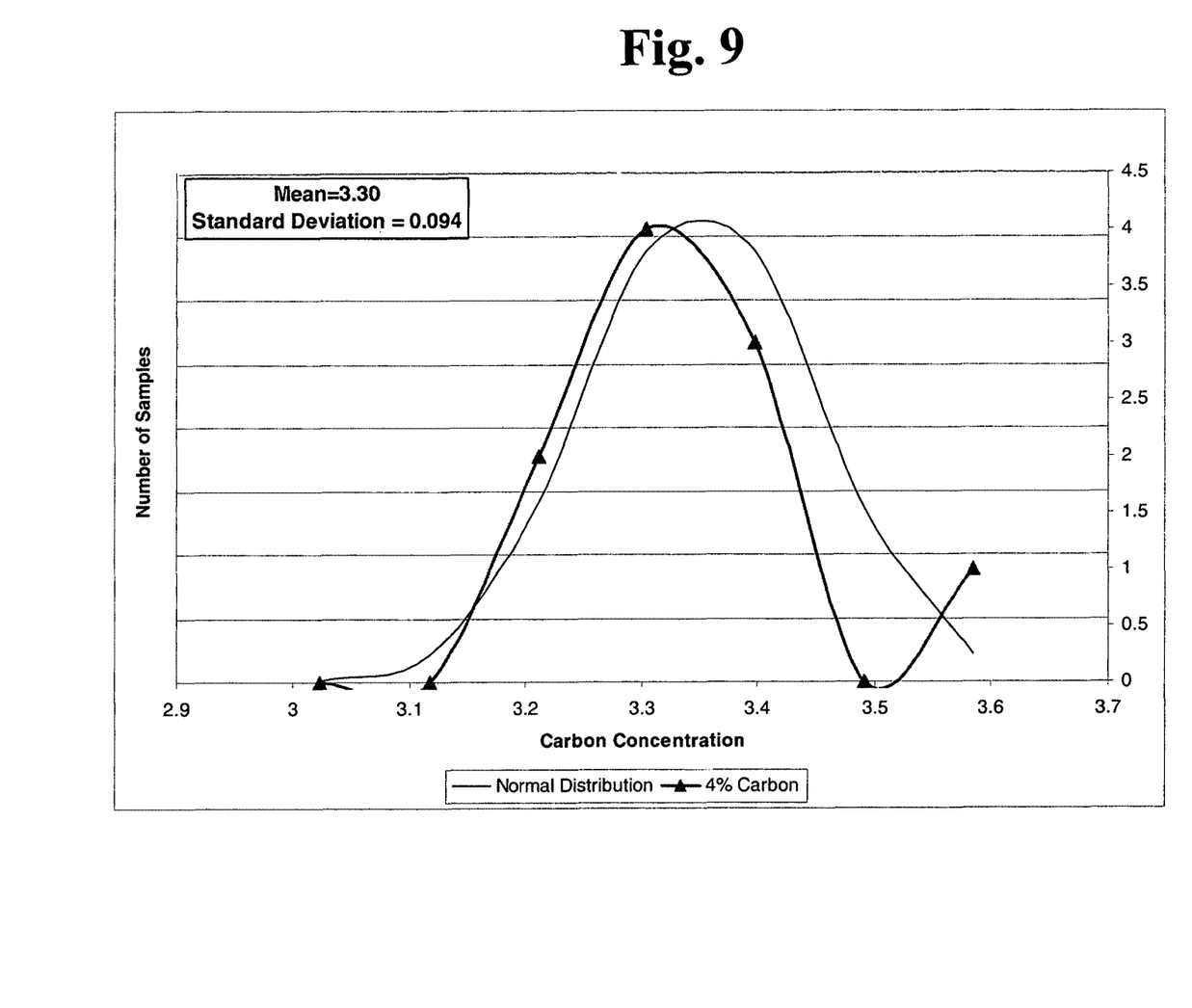
FIG. 9 is a graph of carbon concentration distribution taken from Table 1, for a 4 wt % carbon, in comparison to a 3 sigma Normal distribution.
Figure 10:
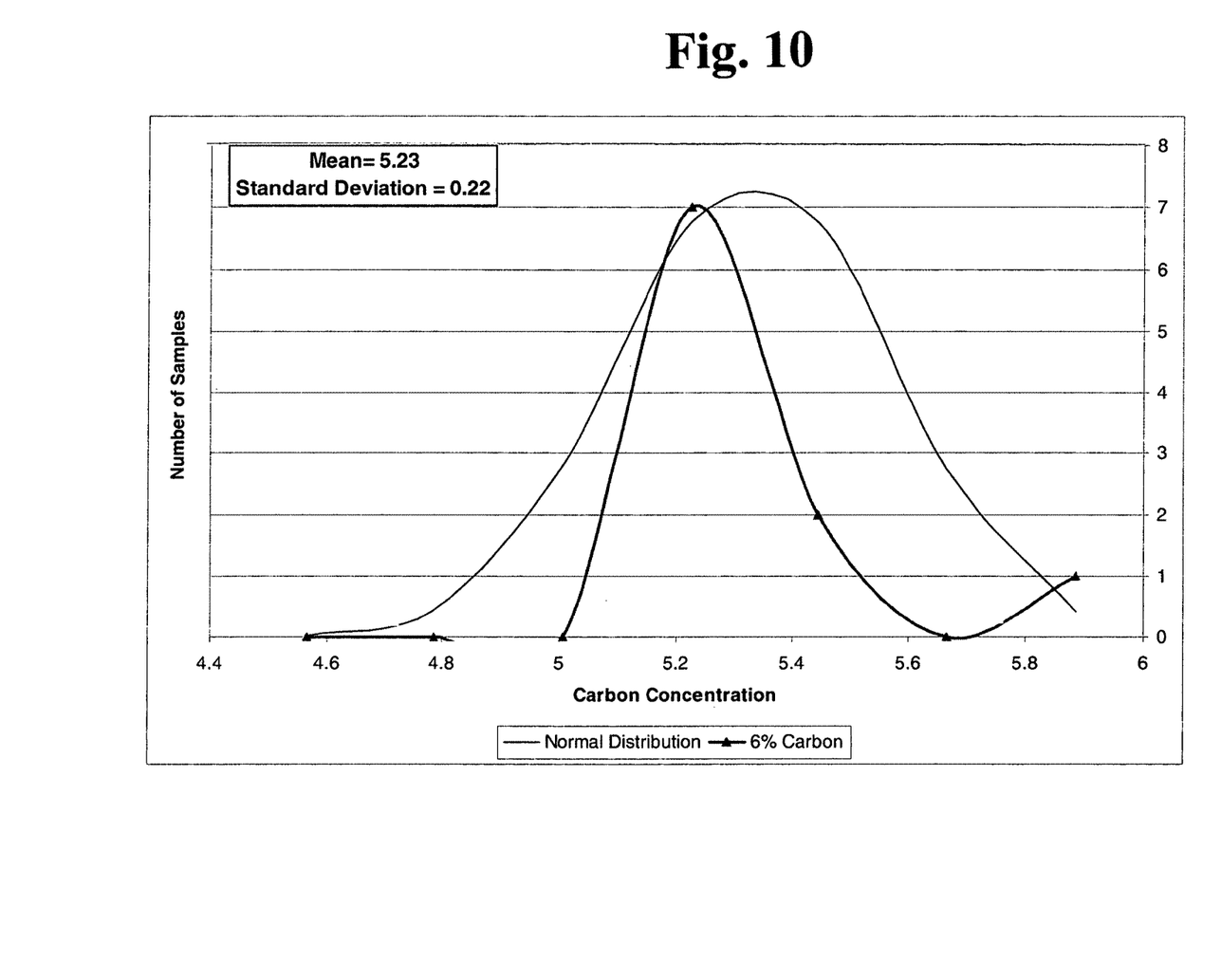
FIG. 10 is a graph of carbon concentration distribution taken from Table 1, for a 6 wt % carbon, in comparison to a 3 sigma Normal distribution.

Carbon added as graphite powder in amounts of 4% by weight and 6% by weight of the lead oxide in the process of the invention at a mixing to conveying ratio of 75:25 with a discharge temperature of 79° C. and a speed of 150 RPM for a retention time of 30 seconds yielded carbon distribution analyses shown in Table 1 below, in which the carbon percentage measured is based on paste weight, which includes water, acid, fibre and lead oxide, and the target carbon is based on the weight of lead oxide only. Ten 2 gram samples were taken from each of the 4% and 6% trials and independently evaluated using the ASTM-E1019 Test Method. Carbon concentrations of the samples tested from both trials indicated a well mixed paste. FIGS. 9 and 10 are graphs of carbon concentration distribution in comparison to a 3 sigma Normal distribution. These results indicate a very tight distribution which by inference means that the continuously produced battery paste is well and homogenously mixed by the continuous process in comparison to battery paste produced by a batch process. The thorough and uniform mixing of the carbon up to a level of 6 wt % of the lead oxide, heretofore not possible beyond about 1 wt % of the lead oxide by the batch process, is an indicator of thorough mixing of other additives including tetrabasic lead seed sulphate, reinforcing fibres and expanders.

TABLE 1

| Sample | Target: 4% Carbon by Weight of Oxide % Carbon Measured | Target: 6% Carbon by Weight of Oxide % Carbon Measured |
| --- | --- | --- |
| 1 | 3.29 | 5.82 |
| 2 | 3.33 | 5.18 |
| 3 | 3.24 | 5.26 |
| 4 | 3.52 | 5.15 |
| 5 | 3.21 | 5.26 |
| 6 | 3.28 | 5.10 |
| 7 | 3.20 | 5.09 |
| 8 | 3.32 | 5.20 |
| 9 | 3.38 | 5.05 |
| 10 | 3.27 | 5.15 |
| Average | 3.30 (approx. 4.0% of oxide) | 5.23 (approx. 6.3% of oxide) |

Figure 7:
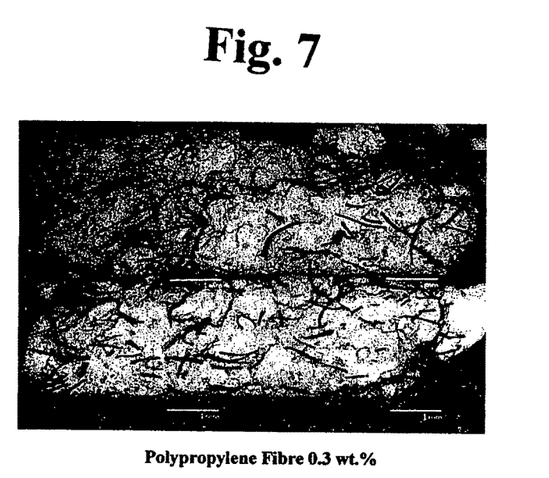
FIG. 7 is a micrograph at 1000× magnification of unformed and cured positive lead oxide paste having 0.3 wt % polypropylene fibre.
Figure 8:
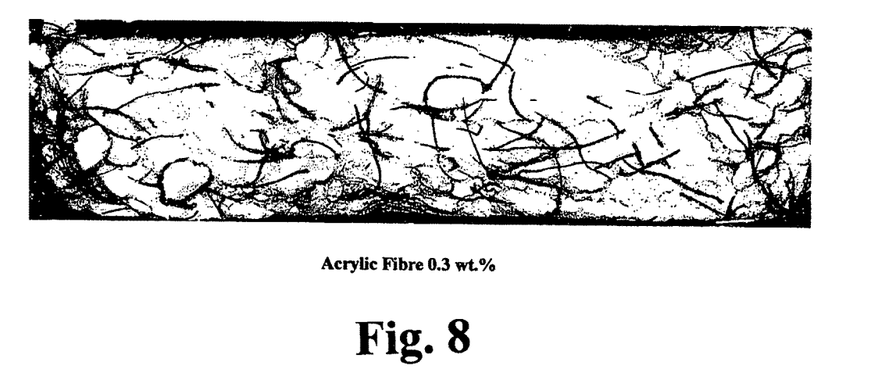
FIG. 8 is a micrograph at 1000× magnification of unformed and cured positive lead oxide paste having 0.3 wt % modacrylic fibre.

Polypropylene fibres having a length of ⅛ inch. and modacrylic fibres having a length of 3/16 inch. were mixed with the lead oxide paste in an amount of 0.3% by weight of the lead oxide. FIG. 7 shows the uniform distribution of 0.3 wt % polypropylene fibre and FIG. 8 shows the uniform distribution of 0.3 wt % modacrylic fibre.

The continuous process of the invention permits uniform distribution of a variety of fibres of increased length with different fibre diameters and increased concentration to suit the application. Uniform distribution of fibres in a paste mix avoids clumping of fibres which could result in costly downtimes, while enhancing the strength and life of battery plates.

The process and apparatus for the invention for continuously producing battery paste provide important advantages over batch processes. Whereas batch processes tend to lose water due to evaporation in the amount of 3 to 5 wt % of the water content during processing, with adverse effects on the free lead content and on the viscosity and shear of the paste, the continuous mixing process with steady-state operating conditions in a closed system has no moisture loss, minimizing environmental problems. Inert fibers added for improved paste cohesion and strength are well dispersed compared to the poor dispersion normally obtained by batch processes. Uniform distribution of constituents, as verified by the carbon distribution graphs, precludes clumping of fibres to substantially eliminate pasting problems that can cause costly line downtime. A widened array of fibres can be used, permitting the use of less costly products, such as glass fibre and polypropylene fibres of different diameters, lengths and concentrations to suit the desired application. Carbon powder can be mixed uniformly with the lead oxide at high concentrations of up to 6 wt % of the lead oxide. The formation of clumps of dry lead paste, often formed at the rim of batch mixer vessels, is minimized or obviated in the continuous reactor mixer of the invention, thereby avoiding dry zones in the paste and facilitating periodic maintenance and cleaning of the mixer. The continuous paste method will break clumps or crusted material into pieces smaller than the 0.060 inch (1.52 mm) clearance of the mixing cams, paddles and shear binder rings within the mixing portion of the process. This conditioning of the material clumps and crust breakup in the continuous paste method reduces the failure rate and downtime in the subsequent pasting operations, particularly when used in the fixed orifice, steel belt and metal drum pasting machines, and essentially eliminates jamming from over size material in the flat belt type of pasting machine. Uniform crystal growth and crystal structure of the lead sulphate controlled by the continuous mixing of homogeneous paste under adjustable mixing and shear conditions and temperature parameters yield a lead sulphate crystal size in the range of 2 to 5 microns in substantially tribasic form with about 3 to 5 wt % metallic lead and a controlled amount of tetrabasic lead sulphate with a consistent moisture content for better grid fill, enhanced grid to active material adhesive strength and plate cohesive strength, reduced paste cracking, and higher reactive surface through volume porosity and pore size control.

The paste product reached a temperature equilibrium quickly, with chemical reactions and crystal growth reaching completion in 30 to 45 seconds of reaction time during passage through the reactor mixer, compared to 20 minutes in a conventional batch mixing vessel operating in a lower temperature range, resulting in lower maintenance, energy and operating costs.

SLI batteries built with electrode plates pasted with continuously produced paste having an exit temperatures of 79° C. on standard production lines have met or exceeded industry standards for Cold Crank Amp Tests and Reserve Capacity. Hot J240 cycling tests for Group 65 batteries exceeded 3,000 cycles. After five Reserve Capacity 100% Depth of Discharge Cycles, no capacity loss was observed.

It will be understood that other embodiments and examples of the invention will be readily apparent to a person skilled in the art, the scope and purview of the invention being defined in the appended claims.

The invention claimed is:

1. A method for continuously producing battery paste for use in a process for continuous production of pasted battery plates comprising feeding particulate lead oxide to an elongated reactor mixer having a plurality of mixing paddles and conveying paddles in series wherein the mixing paddles are structurally distinct from the conveying paddles, continuously injecting water and sulphuric acid sequentially to the lead oxide in the reactor mixer, rapidly mixing and reacting the sulphuric acid with the wetted particulate lead oxide to form a mixture for passage through the elongated reactor mixer for a controlled retention time in the reactor mixer under predetermined mixing and conveying conditions whereby the mixture is subjected to a ratio of mixing paddles to conveying paddles in the reactor mixer of about 65:35 to 80:20, and controlling the temperature of the mixture of lead oxide, water and sulphuric acid as it passes through the elongated reactor along the length of the reactor mixer for a maximum exit temperature of a discharge product in the range of above 60° C. to about 80° C., discharging the battery paste from the elongated reactor mixer for application to battery grids in a state in which the size of tribasic lead sulphate crystals in the battery paste is 5 microns or less, whereby the rate of reaction of the sulphuric acid with the lead oxide for the production of lead sulphate and the particle size, homogeneity, consistency, density, plasticity and porosity of the reaction product are controlled, wherein the 5 micron or less tribasic lead sulphate crystals in the discharged battery paste are produced by the mixing and reacting of the sulphuric acid with the wetted particulate lead oxide to grow the 5 micron or less tribasic lead sulphate crystals in the reactor mixer prior to the mixture being discharged from the reactor mixer and cured.

2. A method as claimed in claim 1, in which the mixture is subjected to a ratio of mixing paddles to conveying paddles in the reactor mixer of about 75:25.

3. A method as claimed in claim 1, in which the discharge product has a temperature in the range of about 68° C. to about 79° C.

4. A method as claimed in claim 3, in which the controlled retention time in the reactor mixer is in the range of 30 to 45 seconds.

5. A method as claimed in claim 4, in which the reactor mixer is operated in the range of about 100 to 150 RPM.

6. A method as claimed in claim 5, in which reinforcing fibres having the characteristics of polymer fibres, polypropylene fibres, modacrylic fibres, glass fibres or cellulose fibres are added with the lead oxide in an amount above 0.15 wt % and up to 0.6 wt % of the lead oxide and uniformly dispersed within the paste, thereby enhancing paste strength and adhesion to grid metal.

7. A method as claimed in claim 6, in which at least one of carbon powder, activated carbon powder, graphite powder, graphite flakes or graphite spheres is added in an amount above 2 wt % and up to 6 wt % of the lead oxide and uniformly dispersed within the paste.

8. A method as claimed in claim 7, in which the temperature of the mixture as it passes through the reactor mixer is controlled to produce an exit temperature of the discharge product of about 79° C.

9. A method as claimed in claim 7, additionally comprising seeding the particulate lead oxide feed with tetrabasic lead sulphate whereby the discharge product contains tetrabasic lead sulphate crystals.

10. A method as claimed in claim 5, additionally comprising continuously applying the reaction battery paste product to battery grids.

11. A method as claimed in claim 7, additionally comprising continuously applying the reaction battery paste product to battery grids.

12. A battery paste continuously produced by the method of claim 1 having a maximum particle size less than 1.52 mm and a lead sulphate crystal size in the range of 2 to 5 microns in substantially tribasic form.

13. A battery paste continuously produced by the method as claimed in claim 7, in which the paste contains at least one of carbon powder, activated carbon powder, graphite powder, graphite flakes or graphite spheres in an amount up to 6 wt % of the lead oxide feed uniformly dispersed within the paste.

14. A battery paste continuously produced by the method as claimed in claim 6, in which the paste contains polymer fibres, polypropylene fibres, modacrylic fibres, glass fibres or cellulose fibres in an amount up to about 0.6 wt % of the lead oxide feed uniformly dispersed within the paste.

15. A battery paste continuously produced by the method as claimed in claim 13, in which the paste contains polymer fibres, polypropylene fibres, modacrylic fibres, glass fibres or cellulose fibres in an amount up to about 0.6 wt % of the lead oxide feed uniformly dispersed within the paste.

16. A method as claimed in claim 5, in which the temperature is controlled to provide a maximum exit temperature of the discharge product of 68-69° C.

17. A method as claimed in claim 5, in which the temperature is controlled to provide a maximum exit temperature of the discharge product above 70° C. for the formulation and growth of tetrabasic lead sulphate whereby the discharge product contains tetrabasic lead sulphate crystals.

18. A method as claimed in claim 17, additionally comprising seeding the particulate lead oxide feed with tetrabasic lead sulphate.

19. A method as claimed in claim 17, in which reinforcing fibres having the characteristics of polymer fibres, polypropylene fibres, modacrylic fibres, glass fibres or cellulose fibres are added with the lead oxide in an amount up to 0.6 wt % of the lead oxide for uniform dispersion of fibres within the paste, thereby enhancing paste strength and adhesion to grid metal.

20. A method as claimed in claim 16, in which reinforcing fibres having the characteristics of polymer fibres, polypropylene fibres, modacrylic fibres, glass fibres or cellulose fibres are added with the lead oxide in an amount up to 0.6 wt % of the lead oxide and in which at least one of carbon powder, activated carbon powder, graphite powder, graphite flakes or graphite spheres is added in an amount up to 6 wt % of the lead oxide and uniformly dispersed within the paste.

21. A method as claimed in claim 19, continuously applying the reaction battery paste product to battery grids.

22. A battery paste continuously produced by the method of claim 17 having a maximum particle size less than 1.52 mm and a lead sulphate crystal size in the range of 2 to 5 microns with a controlled amount of tetrabasic lead sulphate.

23. A battery paste continuously produced by the method of claim 19 having a maximum particle size less than 1.52 mm and a lead sulphate crystal size in the range of 2 to 5 microns with a controlled amount of tetrabasic lead sulphate.

24. A battery paste continuously produced by the method of claim 20 having a maximum particle size less than 1.52 mm and a lead sulphate crystal in tribasic form.

25. A lead acid battery having a plurality of battery electrodes pasted by the continuously produced battery paste claimed in claim 22.

26. A method as claimed in claim 19, providing a clearance between the elongated reactor mixer and the mixing paddles and the conveying paddles of not more than 1.52 mm whereby feed materials are reduced in size to smaller than 1.52 mm in size.

27. A method as claimed in claim 20, providing a clearance between the elongated reactor mixer and the mixing paddles and the conveying paddles of not more than 1.52 mm whereby the particulate lead oxide feed is reduced in size to smaller than 1.52 mm in size.

28. A method as claimed in claim 5, in which reinforcing fibres are added with the lead oxide in an amount up to 0.6 wt % of the lead oxide and uniformly dispersed within the paste, thereby enhancing paste strength and adhesion to grid metal.

29. A method as set forth in claim 1 wherein the mixing paddles are flat and the conveying paddles are helical.

30. A method for continuously producing battery paste for use in a process for continuous production of pasted battery plates comprising feeding particulate lead oxide to an elongated reactor mixer having a plurality of mixing paddles and conveying paddles in series wherein the mixing paddles are structurally distinct from the conveying paddles, continuously injecting water and sulphuric acid sequentially to the lead oxide in the reactor mixer, rapidly mixing and reacting the sulphuric acid with the wetted particulate lead oxide to form a mixture for passage through the elongated reactor mixer for a controlled retention time in the reactor mixer under predetermined mixing and conveying conditions whereby the mixture is subjected to a ratio of mixing paddles to conveying paddles in the reactor mixer of about 65:35 to 80:20, and controlling the temperature of the mixture of lead oxide, water and sulphuric acid as it passes through the elongated reactor along the length of the reactor mixer for a maximum exit temperature of a discharge product in the range of above 60° C. to about 80° C., producing battery paste including tribasic lead sulphate seed crystals, whereby the rate of reaction of the sulphuric acid with the lead oxide for the production of lead sulphate and the particle size, homogeneity, consistency, density, plasticity and porosity of the reaction product are controlled, wherein the tribasic lead sulphate seed crystals in the produced battery paste are produced by the mixing and reacting of the sulphric acid with the wetted particulate lead oxide to grow the tribasic lead sulphate seed crystals in the reactor mixer prior to the mixture being discharged from the reactor mixer and cured.

\* \* \* \* \*

UNITED STATES PATENT AND TRADEMARK OFFICE
CERTIFICATE OF CORRECTION

PATENT NO. : 10,177,369 B2
APPLICATION NO. : 11/812598
DATED : January 8, 2019
INVENTOR(S) : Vincze et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1545 days.

Signed and Sealed this
Sixteenth Day of July, 2019

Andrei Iancu
*Director of the United States Patent and Trademark Office*